United States Patent
Jing et al.

(10) Patent No.: US 10,656,957 B2
(45) Date of Patent: May 19, 2020

(54) INPUT METHOD EDITOR PROVIDING LANGUAGE ASSISTANCE

(71) Applicants: MICROSOFT CORPORATION, Redmond, WA (US); Kun Jing, Beijing (CN); Weipeng Liu, Beijing (CN); Matthew Robert Scott, Beijing (CN); Mu Li, Beijing (CN); Jin Shi, Beijing (CN)

(72) Inventors: Kun Jing, Beijing (CN); Weipeng Liu, Beijing (CN); Matthew Robert Scott, Beijing (CN); Mu Li, Beijing (CN); Jin Shi, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 958 days.

(21) Appl. No.: 14/911,247

(22) PCT Filed: Aug. 9, 2013

(86) PCT No.: PCT/CN2013/081156
§ 371 (c)(1),
(2) Date: Feb. 9, 2016

(87) PCT Pub. No.: WO2015/018055
PCT Pub. Date: Feb. 12, 2015

(65) Prior Publication Data
US 2016/0196150 A1    Jul. 7, 2016

(51) Int. Cl.
*G06F 9/451*     (2018.01)
*G06F 17/27*     (2006.01)
(Continued)

(52) U.S. Cl.
CPC .......... *G06F 9/453* (2018.02); *G06F 3/04845* (2013.01); *G06F 17/2223* (2013.01);
(Continued)

(58) Field of Classification Search
CPC .. G06F 17/2223; G06F 17/273; G06F 17/276; G06F 3/04845; G06F 9/453; G09B 19/04; G09B 19/06
See application file for complete search history.

(56) References Cited

U.S. PATENT DOCUMENTS

| | | | |
|---|---|---|---|
| 4,559,604 | A | 12/1985 | Ichikawa et al. |
| 5,796,866 | A | 8/1998 | Sakurai et al. |

(Continued)

FOREIGN PATENT DOCUMENTS

| | | |
|---|---|---|
| CN | 1609764 | 4/2005 |
| CN | 1851617 | 10/2006 |

(Continued)

OTHER PUBLICATIONS

Yury Kats "Improve the usability of Web applications with type-ahead input fields using JSF, AJAX, and Web services in Rational Application Developer v7" Dec. 5, 2006 (Year: 2006).*

(Continued)

*Primary Examiner* — Andrea N Long
(74) *Attorney, Agent, or Firm* — Faegre Drinker Biddle & Reath LLP

(57) ABSTRACT

An input method editor (IME) configured to provide language assistance across a plurality of applications is disclosed. In one example, the IME is adapted for use by English-as-a-second-language (ESL) users. In a specific example, language assistance may be provided by first detecting a need to suggest a substitute word to a user who is typing within an application. The detection may be based on a probability that a current word is in error. If a need is (Continued)

detected, a suggestion may be obtained for the word, such as from a cloud linguistic service or from a local lexicon and language-model, if network connectivity is poor. Once obtained, the suggestion may be displayed to the user in a non-intrusive manner by user interface element(s). Interaction with the user allows the user to accept or reject the suggestion, and perform other functions, such as relocating user interface elements utilized by the display.

18 Claims, 8 Drawing Sheets

(51) Int. Cl.
*G09B 19/04* (2006.01)
*G09B 19/06* (2006.01)
*G06F 3/0484* (2013.01)
*G06F 17/22* (2006.01)

(52) U.S. Cl.
CPC .......... *G06F 17/273* (2013.01); *G06F 17/276* (2013.01); *G09B 19/04* (2013.01); *G09B 19/06* (2013.01)

(56) References Cited

U.S. PATENT DOCUMENTS

| | | | |
|---|---|---|---|
| 5,873,107 A | 2/1999 | Borovoy et al. |
| 5,987,415 A | 11/1999 | Breese et al. |
| 5,995,928 A | 11/1999 | Nguyen et al. |
| 6,014,638 A | 1/2000 | Burge et al. |
| 6,076,056 A | 6/2000 | Huang et al. |
| 6,085,160 A | 7/2000 | D'hoore et al. |
| 6,092,044 A | 7/2000 | Baker et al. |
| 6,236,964 B1 | 5/2001 | Tamura et al. |
| 6,247,043 B1 | 6/2001 | Bates et al. |
| 6,363,342 B2 | 3/2002 | Shaw et al. |
| 6,377,965 B1 | 4/2002 | Hachamovitch et al. |
| 6,408,266 B1 | 6/2002 | Oon |
| 6,460,015 B1 | 10/2002 | Hetherington et al. |
| 6,731,307 B1 | 5/2004 | Strubbe et al. |
| 6,732,074 B1 | 5/2004 | Kuroda |
| 6,801,893 B1 | 10/2004 | Backfried et al. |
| 6,941,267 B2 | 9/2005 | Matsumoto |
| 6,963,841 B2 | 11/2005 | Handal et al. |
| 7,069,254 B2 | 6/2006 | Foulger et al. |
| 7,089,504 B1 | 8/2006 | Froloff |
| 7,099,876 B1 | 8/2006 | Hetherington et al. |
| 7,107,204 B1 | 9/2006 | Liu et al. |
| 7,165,032 B2 | 1/2007 | Bellegarda |
| 7,194,538 B1 | 3/2007 | Rabe et al. |
| 7,224,346 B2 | 5/2007 | Sheng |
| 7,277,029 B2 | 10/2007 | Thiesson et al. |
| 7,308,439 B2 | 12/2007 | Baird et al. |
| 7,353,247 B2 | 4/2008 | Hough et al. |
| 7,360,151 B1 | 4/2008 | Froloff |
| 7,370,275 B2 | 5/2008 | Haluptzok et al. |
| 7,389,223 B2 | 6/2008 | Atkin et al. |
| 7,447,627 B2 | 11/2008 | Jessee et al. |
| 7,451,152 B2 | 11/2008 | Kraft et al. |
| 7,490,033 B2 | 2/2009 | Chen et al. |
| 7,505,954 B2 | 3/2009 | Heidloff et al. |
| 7,512,904 B2 | 3/2009 | Matthews et al. |
| 7,555,713 B2 | 6/2009 | Yang |
| 7,562,082 B2 | 7/2009 | Zhou |
| 7,565,157 B1 | 7/2009 | Ortega et al. |
| 7,599,915 B2 | 10/2009 | Hill et al. |
| 7,676,517 B2 | 3/2010 | Hurst-Hiller et al. |
| 7,689,412 B2 | 3/2010 | Wu et al. |
| 7,725,318 B2 | 5/2010 | Gavalda et al. |
| 7,728,735 B2 | 6/2010 | Aaron et al. |
| 7,752,034 B2 | 7/2010 | Brockett et al. |
| 7,844,599 B2 | 11/2010 | Kasperski et al. |
| 7,881,934 B2 | 2/2011 | Endo et al. |
| 7,917,355 B2 | 3/2011 | Wu et al. |
| 7,917,488 B2 | 3/2011 | Niu et al. |
| 7,930,676 B1 | 4/2011 | Thomas |
| 7,953,730 B1 | 5/2011 | Bleckner et al. |
| 7,957,955 B2 | 6/2011 | Christie et al. |
| 7,957,969 B2 | 6/2011 | Alewine et al. |
| 7,983,910 B2 | 7/2011 | Subramanian et al. |
| 8,161,073 B2 | 4/2012 | Connor |
| 8,230,336 B2 | 7/2012 | Morrill |
| 8,285,745 B2 | 10/2012 | Li et al. |
| 8,498,864 B1 | 7/2013 | Liang et al. |
| 8,539,359 B2 | 9/2013 | Rapaport et al. |
| 8,564,684 B2 | 10/2013 | Bai |
| 8,597,031 B2 | 12/2013 | Cohen et al. |
| 8,762,356 B1 | 6/2014 | Kogan |
| 8,996,356 B1* | 3/2015 | Yang .................. G06F 3/0237 704/1 |
| 2002/0005784 A1 | 1/2002 | Balkin et al. |
| 2002/0045463 A1 | 4/2002 | Chen et al. |
| 2002/0188603 A1 | 12/2002 | Baird et al. |
| 2003/0160830 A1 | 8/2003 | DeGross |
| 2003/0179229 A1 | 9/2003 | Van Erlach et al. |
| 2003/0220917 A1 | 11/2003 | Copperman et al. |
| 2004/0128122 A1 | 7/2004 | Privault et al. |
| 2004/0220925 A1 | 11/2004 | Liu et al. |
| 2004/0243415 A1 | 12/2004 | Commarford et al. |
| 2005/0144162 A1 | 6/2005 | Liang |
| 2005/0203738 A1 | 9/2005 | Hwang |
| 2005/0216253 A1 | 9/2005 | Brockett |
| 2006/0026147 A1 | 2/2006 | Cone et al. |
| 2006/0167857 A1 | 7/2006 | Kraft et al. |
| 2006/0190822 A1 | 8/2006 | Basson et al. |
| 2006/0204142 A1 | 9/2006 | West et al. |
| 2006/0206324 A1 | 9/2006 | Skilling et al. |
| 2006/0218499 A1* | 9/2006 | Matthews ............. G06F 16/313 715/765 |
| 2006/0242608 A1 | 10/2006 | Garside et al. |
| 2006/0248074 A1 | 11/2006 | Carmel et al. |
| 2007/0016422 A1 | 1/2007 | Mori et al. |
| 2007/0033269 A1 | 2/2007 | Atkinson et al. |
| 2007/0050339 A1 | 3/2007 | Kasperski et al. |
| 2007/0052868 A1 | 3/2007 | Chou et al. |
| 2007/0088686 A1* | 4/2007 | Hurst-Hiller ....... G06F 16/2425 |
| 2007/0089125 A1 | 4/2007 | Claassen |
| 2007/0124132 A1 | 5/2007 | Takeuchi |
| 2007/0150279 A1 | 6/2007 | Gandhi et al. |
| 2007/0162281 A1 | 7/2007 | Saitoh et al. |
| 2007/0167689 A1 | 7/2007 | Ramadas et al. |
| 2007/0192710 A1 | 8/2007 | Platz et al. |
| 2007/0208738 A1 | 9/2007 | Morgan |
| 2007/0213983 A1 | 9/2007 | Ramsey |
| 2007/0214164 A1 | 9/2007 | MacLennan et al. |
| 2007/0233692 A1 | 10/2007 | Lisa et al. |
| 2007/0255567 A1 | 11/2007 | Bangalore et al. |
| 2008/0046405 A1 | 2/2008 | Olds et al. |
| 2008/0115046 A1 | 5/2008 | Yamaguchi |
| 2008/0167858 A1 | 7/2008 | Christie et al. |
| 2008/0171555 A1 | 7/2008 | Oh et al. |
| 2008/0189628 A1 | 8/2008 | Liesche et al. |
| 2008/0195388 A1* | 8/2008 | Bower .................. G06F 3/0237 704/243 |
| 2008/0195645 A1 | 8/2008 | Lapstun et al. |
| 2008/0195980 A1 | 8/2008 | Morris |
| 2008/0208567 A1 | 8/2008 | Brockett et al. |
| 2008/0221893 A1 | 9/2008 | Kaiser |
| 2008/0288474 A1 | 11/2008 | Chin et al. |
| 2008/0294982 A1 | 11/2008 | Leung et al. |
| 2008/0312910 A1 | 12/2008 | Zhang |
| 2008/0319738 A1* | 12/2008 | Liu ....................... G06F 17/273 704/10 |
| 2009/0002178 A1 | 1/2009 | Guday et al. |
| 2009/0043584 A1 | 2/2009 | Philips |
| 2009/0043741 A1 | 2/2009 | Kim |
| 2009/0077464 A1 | 3/2009 | Goldsmith et al. |
| 2009/0106224 A1 | 4/2009 | Roulland et al. |
| 2009/0128567 A1 | 5/2009 | Shuster et al. |
| 2009/0150322 A1* | 6/2009 | Bower .................. G06F 17/276 706/50 |
| 2009/0154795 A1 | 6/2009 | Tan et al. |

(56) References Cited

U.S. PATENT DOCUMENTS

| | | |
|---|---|---|
| 2009/0187515 A1 | 7/2009 | Andrew et al. |
| 2009/0187824 A1 | 7/2009 | Hinckley et al. |
| 2009/0210214 A1* | 8/2009 | Qian ................ G06F 16/3337 704/2 |
| 2009/0216690 A1* | 8/2009 | Badger ................ G06F 3/0237 706/11 |
| 2009/0222437 A1 | 9/2009 | Niu et al. |
| 2009/0249198 A1 | 10/2009 | Davis et al. |
| 2009/0300546 A1 | 12/2009 | Kwok et al. |
| 2009/0313239 A1 | 12/2009 | Wen et al. |
| 2010/0005086 A1 | 1/2010 | Wang et al. |
| 2010/0122155 A1 | 5/2010 | Monsarrat |
| 2010/0125811 A1 | 5/2010 | Moore et al. |
| 2010/0138210 A1 | 6/2010 | Seo et al. |
| 2010/0146407 A1 | 6/2010 | Bokor et al. |
| 2010/0169770 A1 | 7/2010 | Hong et al. |
| 2010/0180199 A1 | 7/2010 | Wu et al. |
| 2010/0217581 A1 | 8/2010 | Hong |
| 2010/0217795 A1* | 8/2010 | Hong ...................... G06F 3/018 709/203 |
| 2010/0231523 A1 | 9/2010 | Chou |
| 2010/0245251 A1 | 9/2010 | Yuan et al. |
| 2010/0251304 A1 | 9/2010 | Donoghue et al. |
| 2010/0306139 A1 | 12/2010 | Wu et al. |
| 2010/0306248 A1 | 12/2010 | Bao et al. |
| 2010/0309137 A1 | 12/2010 | Lee |
| 2010/0315266 A1* | 12/2010 | Gunawardana ....... G06F 3/0237 341/22 |
| 2011/0014952 A1 | 1/2011 | Minton |
| 2011/0041077 A1 | 2/2011 | Reiner |
| 2011/0060761 A1 | 3/2011 | Fouts |
| 2011/0066431 A1 | 3/2011 | Ju et al. |
| 2011/0087483 A1 | 4/2011 | Hsieh et al. |
| 2011/0107265 A1 | 5/2011 | Buchanan et al. |
| 2011/0131642 A1 | 6/2011 | Hamura et al. |
| 2011/0137635 A1 | 6/2011 | Chalabi et al. |
| 2011/0161080 A1 | 6/2011 | Ballinger et al. |
| 2011/0161311 A1* | 6/2011 | Mishne ................ G06F 16/951 707/719 |
| 2011/0173172 A1 | 7/2011 | Hong et al. |
| 2011/0178981 A1 | 7/2011 | Bowen et al. |
| 2011/0184723 A1 | 7/2011 | Huang et al. |
| 2011/0188756 A1 | 8/2011 | Lee et al. |
| 2011/0191321 A1 | 8/2011 | Gade et al. |
| 2011/0201387 A1 | 8/2011 | Paek et al. |
| 2011/0202836 A1* | 8/2011 | Badger ................ G06F 3/0237 715/702 |
| 2011/0202876 A1* | 8/2011 | Badger ................ G06F 3/0237 715/816 |
| 2011/0219299 A1 | 9/2011 | Scalosub |
| 2011/0258535 A1 | 10/2011 | Adler, III et al. |
| 2011/0282903 A1 | 11/2011 | Zhang |
| 2011/0289105 A1 | 11/2011 | Hershowitz |
| 2011/0296324 A1 | 12/2011 | Goossens et al. |
| 2012/0016678 A1 | 1/2012 | Gruber et al. |
| 2012/0019446 A1* | 1/2012 | Wu .......................... G06F 3/018 345/168 |
| 2012/0022853 A1 | 1/2012 | Ballinger et al. |
| 2012/0023103 A1 | 1/2012 | Soderberg et al. |
| 2012/0029902 A1 | 2/2012 | Lu et al. |
| 2012/0035932 A1 | 2/2012 | Jitkoff et al. |
| 2012/0036468 A1 | 2/2012 | Colley |
| 2012/0041752 A1 | 2/2012 | Wang et al. |
| 2012/0060113 A1 | 3/2012 | Sejnoha et al. |
| 2012/0060147 A1 | 3/2012 | Hong et al. |
| 2012/0078611 A1 | 3/2012 | Soltani et al. |
| 2012/0113011 A1 | 5/2012 | Wu et al. |
| 2012/0117506 A1 | 5/2012 | Koch et al. |
| 2012/0143897 A1 | 6/2012 | Wei et al. |
| 2012/0173222 A1 | 7/2012 | Wang et al. |
| 2012/0222056 A1 | 8/2012 | Donoghue et al. |
| 2012/0296627 A1* | 11/2012 | Suzuki .................... G06F 17/27 704/2 |
| 2012/0297294 A1 | 11/2012 | Scott et al. |
| 2012/0297332 A1 | 11/2012 | Changuion et al. |
| 2012/0311480 A1 | 12/2012 | Cohen |
| 2013/0016113 A1 | 1/2013 | Adhikari et al. |
| 2013/0054617 A1 | 2/2013 | Colman |
| 2013/0091409 A1 | 4/2013 | Jeffery |
| 2013/0132359 A1 | 5/2013 | Lee et al. |
| 2013/0151533 A1* | 6/2013 | Udupa ................ G06F 16/3325 707/742 |
| 2013/0159920 A1 | 6/2013 | Scott et al. |
| 2013/0282624 A1* | 10/2013 | Schackmuth ........ G08B 21/182 705/412 |
| 2013/0298030 A1 | 11/2013 | Nahumi et al. |
| 2013/0346872 A1 | 12/2013 | Scott et al. |
| 2014/0040238 A1 | 2/2014 | Scott et al. |
| 2015/0081369 A1 | 3/2015 | Sarrazin et al. |
| 2015/0088927 A1 | 3/2015 | Sarrazin et al. |
| 2015/0106702 A1 | 4/2015 | Scott et al. |
| 2015/0121291 A1 | 4/2015 | Scott et al. |
| 2015/0127748 A1 | 5/2015 | Buryak |
| 2015/0161126 A1 | 6/2015 | Wang et al. |
| 2015/0370833 A1 | 12/2015 | Fey et al. |

FOREIGN PATENT DOCUMENTS

| | | |
|---|---|---|
| CN | 1908863 | 2/2007 |
| CN | 101183355 | 5/2008 |
| CN | 101276245 | 10/2008 |
| CN | 101286092 | 10/2008 |
| CN | 101286093 | 10/2008 |
| CN | 101286094 | 10/2008 |
| CN | 101587471 | 11/2009 |
| CN | 101661474 | 3/2010 |
| CN | 102012748 | 4/2011 |
| CN | 102141889 A | 8/2011 |
| CN | 102144228 | 8/2011 |
| CN | 102193643 | 9/2011 |
| CN | 102314441 | 1/2012 |
| CN | 102314461 | 1/2012 |
| JP | 2000148748 | 5/2000 |
| JP | 2011507099 | 3/2011 |
| JP | 2012008874 | 1/2012 |
| JP | 2012094156 | 5/2012 |
| WO | WO2010105440 | 9/2010 |

OTHER PUBLICATIONS

OPENJS Waiting Until User Stops Typing to Check the Status Using Ajax Jan. 29, 2009—Wayback Machine archived date (Year: 2009).*

The Chinese Office Action dated Mar. 24, 2017 for Chinese Patent Application No. 201280074281.4, a counterpart foreign application of U.S. Appl. No. 13/586,267.

Office action for U.S. Appl. No. 13/635,306, dated Feb. 25, 2017, Scott et al., "Input Method Editor", 23 pages.

"Oral Hearing Issued in European Patent Application No. 13891201. 9", dated Jan. 26, 2018, 10 Pages.

"Second Office Action Issued in Chinese Patent Application No. 201380078787.7", dated Apr. 3, 2018, 12 Pages.

The Chinese Office Action dated Jan. 3, 2017 for Chinese patent application No. 201280074383.6, a counterpart foreign application of U.S. Appl. No. 13/635,306.

The Chinese Office Action dated Feb. 3, 2017 for Chinese patent application No. 201280074382.1, a counterpart foreign application of U.S. Appl. No. 13/635,219.

The European Office Action dated Dec. 22, 2016 for European patent application No. 12880149.5, a counterpart foreign application of U.S. Appl. No. 13/635,219, 11 pages.

Office action for U.S. Appl. No. 13/635,219, dated Nov. 14, 2016, Scott et al., "Cross-Lingual Input Method Editor", 27 pages.

Office action for U.S. Appl. No. 13/701,008, dated Nov. 30, 2016, Wang et al., "Feature-Based Candidate Selection", 21 pages.

Ciccolini, Ramiro, "Baidu IME More literate in Chinese input," Published Sep. 15, 2011, retrieved at << http://www.itnews-blog.com/it/81630.html>>, 4 pages.

(56) References Cited

OTHER PUBLICATIONS

Millward, Steven, "Baidu Japan Acquires Simeji Mobile App Team, for added Japanese Typing fun," Published Dec. 13, 2011, 3 pages.
Ben-Haim, et al., "Improving Web-based Image Search via Content Based Clustering", Proceedings of the 2006 Conference on Computer Vision and Pattern Recognition Workshop (CVPRW '06), IEEE, Jun. 17, 2006, 6 pages.
Berg, et al., "Animals on the Web", Proceedings of the 2006 IEEE Computer Society Conference on Computer Vision and Pattern Recognition (CVPR '06), vol. 2, IEEE, Jun. 17, 2006, pp. 1463-1470.
The Chinese Office Action dated Jun. 28, 2016 for Chinese Patent Application No. 201280074281.4, a counterpart foreign application of U.S. Appl. No. 13/586,267.
The Chinese Office Action dated Jun. 3, 2016 for Chinese Patent Application No. 201280074382.1, a counterpart foreign application of U.S. Appl. No. 13/635,219, 18 pages.
Damper, "Self-Learning and Connectionist Approaches to Text-Phoneme Conversion", retrieved on May 26, 2010 at <<ftp://ftp.cogsci.ed.ac.uk/pub/joe/newbull.ps>>, UCL Press, Connectionist Models of Memory and Language, 1995, pp. 117-144.
"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.
Dinamik-Bot, et al., "Input method", retrieved on May 6, 2015 at <<http://en.wikipedia.org/w/index.php?title=Input_method&oldid=496631911>>, Wikipedia, the free encyclopedia, Jun. 8, 2012, 4 pages.
Engkoo Pinyin Redefines Chinese Input, Published on: May 13, 2013, Available at: http://research.microsoft.com/en-us/news/features/engkoopinyinime-051313.aspx.
"English Assistant", Published on: Apr. 19, 2013, Available at: http://bing.msn.cn/pinyin/.
The European Office Action dated Oct. 8, 2015 for European patent application No. 12879804.8, a counterpart foreign application of U.S. Appl. No. 13/586,267, 9 pages.
The European Office Action dated Nov. 27, 2015 for European patent application No. 12880149.5, a counterpart foreign application of U.S. Appl. No. 13/635,219, 10 pages.
The European Office Action dated Mar. 1, 2016 for European Patent Application No. 12883902.4, a counterpart foreign application of U.S. Appl. No. 13/701,008, 8 pages.
The European Office Action dated Jun. 18, 2015 for European patent application No. 12879676.0, a counterpart foreign application of U.S. Appl. No. 13/635,306, 5 pages.
The European Office Action dated Jul. 19, 2016 for European Patent Application No. 13891201.9, a counterpart foreign application of U.S. Appl. No. 14/911,247, 7 pages.
The European Office Action dated Jul. 19, 2016 for European patent application No. 12880149.5, a counterpart foreign application of U.S. Appl. No. 13/635,219, 7 pages.
The Supplementary European Search Report dated May 20, 2015 for European Patent Application No. 12879676.0, 3 pages.
The Partial Supplemenary European Search Report dated Oct. 26, 2015 for European patent application No. 12883902.4, 7 pages.
The Supplementary European Search Report dated Nov. 12, 2015 for European patent application No. 12880149.5, 7 pages.
The European Search Report dated Feburary 18, 2016 for European patent application No. 12883902.4, 7 pages.
The Supplemenary European Search Report dated Jul. 16, 2015 for European patent application No. 12880149.5, 5 pages.
The Supplemenary European Search Report dated Sep. 14, 2015 for European patent application No. 12879804.8, 5 pages.
"File", Microsoft Computer Dictionary, Fifth Edition, retrieved on May 13, 2011, at <<http://academic.safaribooksonline.com/book/communications/0735614954>>, Microsoft Press, May 1, 2002, 2 pages.

Final Office Action for U.S. Appl. No. 13/109,021, dated Jan. 11, 2013, Scott et al., "Network Search for Writing Assistance", 16 pages.
"Google launched Input Method editor—type anywhere in your language," published Mar. 2, 2010, retrieved at <<http://shoutingwords.com/google-launched-input-method-editor.html>>, 12 pages.
Lenssen, Philipp, "Google Releases Pinyin Converter," Published Apr. 4, 2007, retrieved at <<http://blogoscoped.com/archive/2007-04-04-n49.html>>, 3 pages.
Guo et al., "NaXi Pictographs Input Method and WEFT", Journal of Computers, vol. 5, No. 1, Jan. 2010, pp. 117-124.
"Innovative Chinese Engine", Published on: May 2, 2013, Available at: http://bing.msn.cn/pinyin/help.shtml.
"Input Method (IME)", Retrieved on: Jul. 3, 2013, Available at: http://www.google.co.in/inputtools/cloud/features/input-method.html.
International Search Report & Written Opinion for PCT Patent Application No. PCT/CN2013/081156, dated May 5, 2014; filed Aug. 9, 2013, 14 pages.
The Japanese Office Action dated Oct. 31, 2016 for Japanese Patent Application No. 2015-528828, a counterpart foreign application of U.S. Appl. No. 13/701,008.
The Japanese Office Action dated May 24, 2016 for Japanese patent application No. 2015-528828, a counterpart foreign application of U.S. Appl. No. 13/701,008, 17 pages.
Miessler, "7 Essential Firefox Quicksearches", Retrieved from <<https:danielmiessler.com/blog/7-essential-firefox-quicksearches/>>, Published Aug. 19, 2007, 2 pages.
Office action for U.S. Appl. No. 13/567,305, dated Jan. 30, 2014, Scott, et al., "Business Intelligent In-Document Suggestions", 14 pages.
Office action for U.S. Appl. No. 13/315,047, dated Feb. 12, 2014, Liu, et al., "Sentiment Aware User Interface Customization", 14 pages.
Office Action for U.S. Appl. No. 13/109,021, dated Mar. 11, 2014, Dyer, A.R., "Network Search for Writing Assistance," 18 pages.
Office action for U.S. Appl. No. 13/586,267, dated Jan. 2, 2015, Scott et al., "Input Method Editor Application Platform", 19 pages.
Office action for U.S. Appl. No. 12/693,316, dated Oct. 16, 2014, Huang, et al., "Phonetic Suggestion Engine", 24 pages.
Office Action for U.S. Appl. No. 13/315,047, dated Oct. 2, 2014, Weipeng Liu, "Sentiment Aware User Interface Customization", 12 pages.
Office action for U.S. Appl. No. 12/693,316, dated Oct. 30, 2013, Huang, et al., "Phonetic Suggestion Engine", 24 pages.
Office action for U.S. Appl. No. 13/331,023 dated Nov. 20, 2015, Scott et al., "Scenario-Adaptive Input Method Editor", 25 pages.
Office action for U.S. Appl. No. 13/586,267 dated Nov. 6, 2015, Scott et al., "Input Method Editor Application Platform", 22 pages.
Office action for U.S. Appl. No. 13/331,023, dated Feb. 12, 2015, Scott et al, "Scenario-Adaptive Input Method Editor", 20 pages.
Office action for U.S. Appl. No. 13/635,306, dated Feb. 25, 2016, Scott et al., "Input Method Editor", 29 pages.
Office action for U.S. Appl. No. 13/635,219, dated Mar. 13, 2015, Scott et al., "Cross-Lingual Input Method Editor", 21 pages.
Office action for U.S. Appl. No. 13/701,008, dated Mar. 17, 2016, Wang et al., "Feature-Based Candidate Selection", 13 pages.
Office action for U.S. Appl. No. 13/635,219, dated Mar. 24, 2016, Scott et al., "Cross-Lingual Input Method Editor", 29 pages.
Office action for U.S. Appl. No. 13/635,306, dated Mar. 27, 2015, Scott et al., "Input Method Editor", 18 pages.
Office action for U.S. Appl. No. 13/315,047, dated Apr. 24, 2014, Liu et al., "Sentiment Aware User Interface Customization", 13 pages.
Office action for U.S. Appl. No. 13/315,047, dated Apr. 28, 2015, Liu et al., "Sentiment Aware User Interface Customization", 12 pages.
Office action for U.S. Appl. No. 13/701,008, dated May 12, 2015, Wang et al., "Feature-Based Candidate Selection", 12 pages.
Office action for U.S. Appl. No. 12/693,316, dated May 19, 2014, Huang et al., "Phonetic Suggestion Engine", 22 pages.
Office action for U.S. Appl. No. 13/586,267, dated May 8, 2015, Scott et al., "Input Method Editor Application Platform", 18 pages.

(56) References Cited

OTHER PUBLICATIONS

Office action for U.S. Appl. No. 13/701,008, dated Jun. 15, 2015, Wang et al., "Feature-Based Candidate Selection", 17 pages.
Office action for U.S. Appl. No. 12/693,316, dated Jun. 19, 2013, Huang et al., "Phonetic Suggestion Engine", 20 pages.
Office Action for U.S. Appl. No. 13/109,021, dated Jun. 19, 2014, Dyer, A.R., "Network Search for Writing Assistance," 42 pages.
Office action for U.S. Appl. No. 13/331,023, dated Jun. 26, 2015, Scott et al., "Scenario-Adaptive Input Method Editor", 23 pages.
Office action for U.S. Appl. No. 13/586,267, dated Jun. 7, 2016, Scott et al., "Input Method Editor Application Platform", 24 pages.
Office action for U.S. Appl. No. 13/635,306, dated Jul. 28, 2016, Scott et al., "Input Method Editor", 24 pages.
Office action for U.S. Appl. No. 13/586,267, dated Jul. 31, 2014, Scott et al., "Input Method Editor Application Platform", 20 pages.
Final Office Action for U.S. Appl. No. 13/635,219, dated Aug. 10, 2016, Matthew Robert Scott, "Cross-Lingual Input Method Editor", 29 pages.
Office action for U.S. Appl. No. 13/635,306, dated Aug. 14, 2015, Scott et al., "Input Method Editor", 26 pages.
Office Action for U.S. Appl. No. 13/109,021, dated Aug. 21, 2012, Scott et al., "Network Search for Writing Assistance", 19 pages.
Non-Final Office Action for U.S. Appl. No. 13/331,023, dated Aug. 4, 2014, Matthew Robert Scott et al., "Scenario-Adaptive Input Method Editor", 20 pages.
Office action for U.S. Appl. No. 13/315,047, dated Sep. 24, 2015, Liu et al., "Sentiment Aware User Interface Customization", 12 pages.
Office Action for U.S. Appl. No. 13/109,021, dated Sep. 25, 2013, Scott et al., "Network Search for Writing Assistance", 18 pages.
Office action for U.S. Appl. No. 13/635,219, dated Sep. 29, 2015, Scott et al., "Cross-Lingual Input Method Editor", 14 page.
Office Action for U.S. Appl. No. 13/109,021, dated Sep. 30, 2014, Dyer, A.R., "Network Search for Writing Assistance," 17 pages.
International Search Report & Written Opinion for PCT Patent Application No. PCT/US2013/053321, dated Oct. 1, 2013, filed date Aug. 2, 2013, 9 Pages.
PCT International Preliminary Report on Patentability dated Feb. 18, 2016 for PCT Application No. PCT/CN2013/081156, 8 pages.
PCT International Preliminary Report on Patentability dated Mar. 12, 2015 for PCT Application No. PCT/CN2012/080749, 8 pages.
"Prose", Dictionary.com, Jun. 19, 2014, 2 pgs.
Wikipedia, "Soundex", retrieved on Jan. 20, 2010 at http://en.wikipedia.org/wiki/soundex, 3 pgs.
"Third Office Action Issued in Chinese Patent Application No. 201380078787.7", dated Oct. 10, 2018, 9 Pages.
"First Office Action & Search Report Issued in Chinese Patent Application No. 201380078787.7", dated Jul. 19, 2017, 22 Pages.
"Supplementary Search Report Issued in European Patent Application No. 13891201.9", dated Jul. 6, 2016, 4 Pages.
"Office Action Issued in Chinese Patent Application No, 201380078787.7", dated Mar. 14, 2019, 12 Pages.
U.S. Appl. No. 13/63,5219, filed Sep. 14, 2011, Scott, et al., "Cross-Lingual Input Method Editor".

\* cited by examiner

INPUT METHOD EDITOR PROVIDING LANGUAGE ASSISTANCE

RELATED APPLICATIONS

This application is a 35 U.S.C. 371 National Stage application of International Application No. PCT/CN2013/081156, filed Aug. 9, 2013, the entire contents of which are incorporated herein by reference.

BACKGROUND

Today, input method editors (IMEs) may be used to input non-Latin characters (e.g., Chinese characters) into a computer program using a conventional keyboard. IMEs are an indispensable tool for a significant portion of East Asian users. IMEs may also provide an English mode, wherein assistance is provided for non-native users creating English language documents. In the English mode, English assistance may be provided, such as word or spelling suggestions in response to problematic user typing. The assistance may also include automated spelling corrections, multiple word-choice suggestions and/or anticipated words suggestions, etc. Unfortunately, known IMEs are intrusive, and tend to distract a user with unwanted suggestions. Turning such IMEs on and off as suggestions are needed is awkward. Moreover, the user interfaces (UIs) of known IMEs are inflexible, and do not allow the user to optimally control intrusion of the IME.

SUMMARY

Techniques to provide language assistance and operate an input method editor (IME) are disclosed. The IME may be configured to provide language assistance across a plurality of applications. In one example, an IME may be adapted for use by English-as-a-second-language (ESL) users. In a specific example, language assistance may be provided by first detecting a need to provide a suggestion to a user typing within an application. The suggestion may include a substitute word, substitute spelling or substitute grammar. The detection may be based on a probability that a current word or word-use is in error. If need for a suggestion is detected, a suggestion may be obtained for the word. The suggestion may be based on input from a cloud linguistic service (CLS). If network connectivity is unavailable, a local lexicon and/or language-model may be used to obtain the suggestion. Once obtained, the suggestion may be displayed to the user. The display may include adjustable user interface element(s), which allow the user to minimize intrusiveness of the user interface when not needed. The IME may provide opportunities for interaction with the user. For example, the interaction may allow may allow the user to accept or reject the suggestion, or copy the suggestion to a clipboard for use by a plurality of applications. The interaction may allow the user to relocate or minimize user interface elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as indicated by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for operation of an input method editor (IME) configured to provide language assistance across a plurality of applications. In one example, the IME provides an adjustable user interface that may be made unobtrusive if desired, to reduce cognitive overload of a user. The IME may be adapted for use by English-as-a-second-language (ESL) users. In one example, language assistance is provided by detecting a need to suggest a substitute word to a user who is typing within an application. The detection may be based on a probability that a current word is in error or by observation of the difficulty (typing speed, backspaces, etc.) of the user typing the word. If a need for assistance is detected, a suggestion may be obtained for the word. The suggestion may be obtained from a cloud linguistic service or from a local lexicon and/or language-model, if network connectivity is poor. Once obtained, the suggestion may be displayed to the user by a user interface. Aspects of the user interface may be adjustable by the user, and may particularly provide non-intrusive information to the user that does not distract from the user's focus on typing and input. Following the suggestion, interaction with the user allows the user to accept or reject the suggestion, and perform other functions, such as relocating user interface elements utilized by the display.

Example System and Techniques

Figure 1:
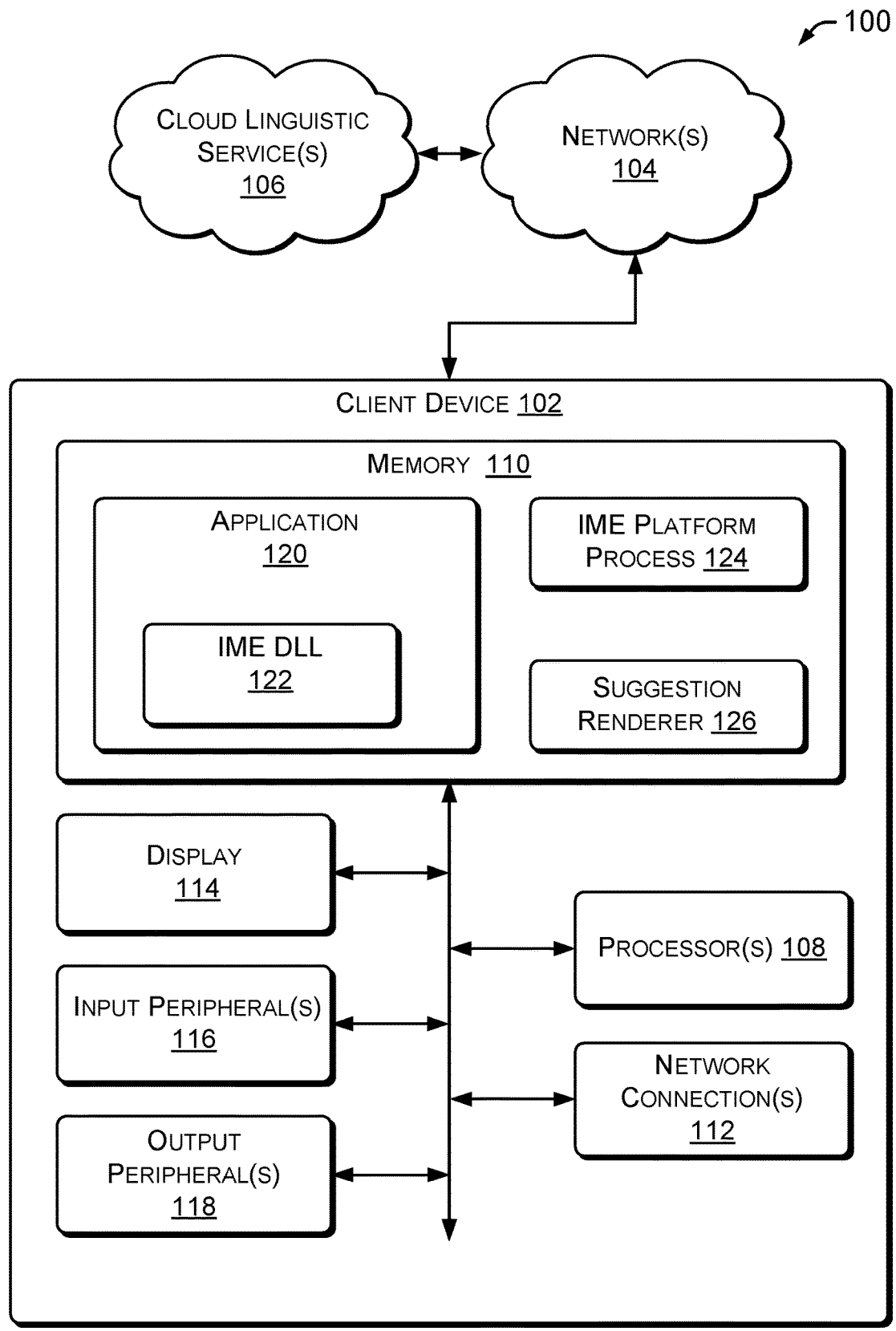
FIG. 1 is a block diagram showing a client device having an example input method editor (IME).

FIG. 1 is a block diagram showing an example system 100 within which an input method editor (IME) may be operated. In an example of the system 100, a client device 102 may connect over a network 104 (e.g., an intranet, wide area network (WAN), the Internet, etc.) with a cloud linguistic service(s) 106. The cloud linguistic service(s) 106 is shown as a single entity; however, the services could be provided by a number of entities, organizations, corporations, etc.

In one example, the client device 102 may include one or more processors 108 in communication with one or more memory devices 110. A network connection 112 may provide an interface to the network 104. The client device 102 may include and/or communicate with one or more peripheral devices. A first example of a peripheral device, a display 114, can operate as an input and output peripheral with a touch screen, or as an output peripheral without a touch screen. Thus, display 114 may be provided to receive touch input and present visual output. In a second example of peripheral device(s) 116, input peripheral devices can include a hard and/or soft keyboard, a mouse or other pointing device, a microphone, and/or gestural input devices such a one or more cameras or other gesture sensors. In a third example of peripheral device(s) 118, output peripheral devices can include one or more speakers, a printer, auxiliary monitor, or other output devices.

An application 120 may be defined within memory 110 and configured for operation and/or execution by the processor(s) 108. The application 120 may be configured for any of a wide variety of purposes, including word-processing and/or text-based data entry. Thus, application 120 may include a word processor, an Internet browser, an email client, or other application into which a user may type or otherwise input text.

In the example of FIG. 1, an IME may be configured to provide language assistance in a discrete manner to avoid or minimize cognitive overload to a user who is primarily involved in text input and to a lesser degree with text error correction. In the example of FIG. 1, an IME may include an input method editor dynamic link library, e.g., IME DLL 122, an IME platform process 124 and a suggestion renderer 126. The IME may also provide a user interface, which may be rendered by the suggestion renderer 126 for presentation via display 114 according to the examples of FIGS. 3 and/or 4.

The IME DLL 122 may be defined "in-process," i.e., within the application 120. The IME DLL 122 may be configured to receive input, such as keystrokes, and pass them on to an IME platform process 124 and to the application 120.

In the example of FIG. 1, the IME platform process 124 is configured to receive a string of input words, detect if errors are present and if suggestions to overcome the errors are indicated, to process candidate suggestions (possibly from multiple local and remote sources), and to deliver the suggestions as output to the user for consideration. The IME platform process 124 may be defined "out-of-process," i.e., located within a defined memory address range separate and distinct from the address range within which the application 120 is defined. In at least one embodiment, the IME platform process 124 receives keystrokes from the IME DLL 122. Using the keystrokes, the IME platform process 124 performs a detection process, by which spelling, word use, grammar and other errors are discovered. Having detected an error or issue, the IME platform process 124 may determine a suggestion that will assist the user. The IME platform process 124 manages a display function, wherein the suggestion is provided to the user by operation of a user interface in a non-intrusive manner. The IME platform process 124 may also interact with the user, such as to receive the user's acceptance or rejection of the suggestion, or to adjust the user interface location or operation, etc.

Figure 3:
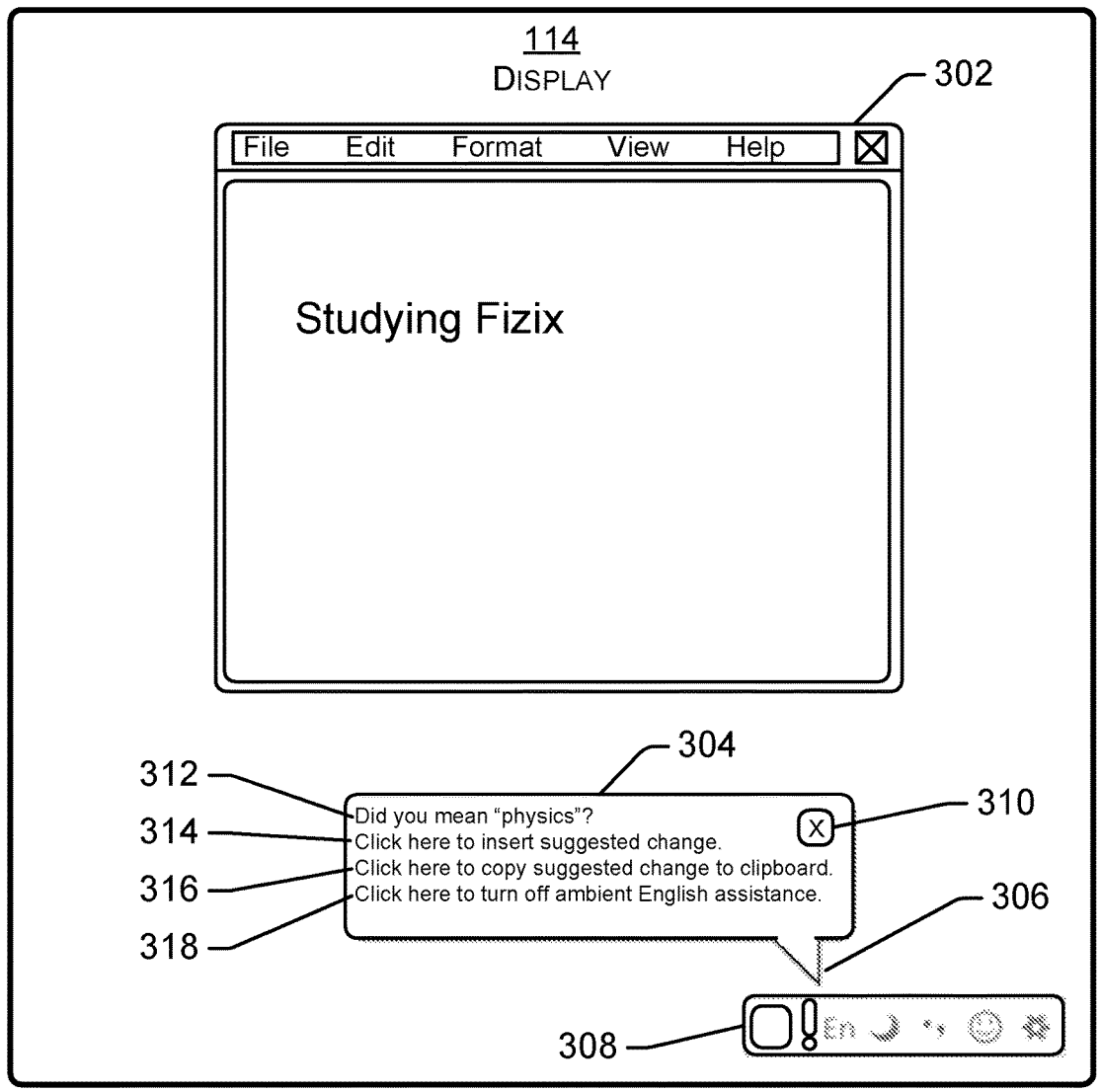
FIG. 3 shows an example user interface for an IME.

The suggestion renderer 126 may be configured to provide and manage a user interface, such as seen in the examples of FIGS. 3 and/or 4. Through operation of the suggestion renderer 126, specific instances of language assistance may be provided to the user. For example, the suggestion renderer 126 may render text or graphics for a notification window, IME bar or other user interface icon, widget or display, etc. The suggestion renderer 126 may operate at the direction of the IME platform process 124, and may also receive input and/or direction from the user. For example, the user may select preferred options for display of the language assistance. The options may allow the user to position a user interface element (e.g., a notification window) in a preferred location. The options may allow the user to reduce distraction caused by the user interface, such as by minimizing all or part of the interface, particularly during times it is not needed by the user.

Figure 2:
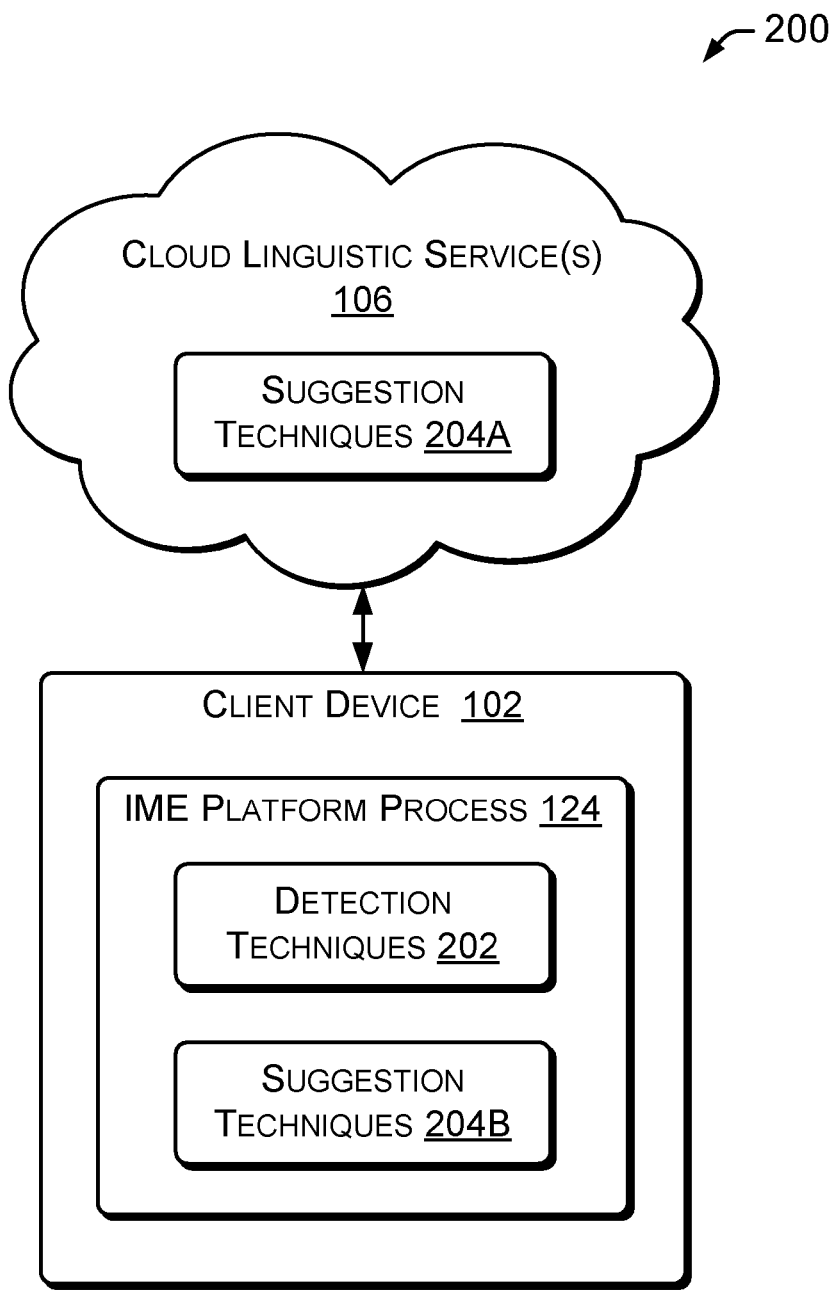
FIG. 2 shows an example division of functionality within an IME.

FIG. 2 shows an example system 200 illustrating one possible division of functionality within the IME platform process 124 of FIG. 1. The example functional division is for purposes of example only, and is therefore representative of techniques (not shown) that are within the scope of the discussion herein.

Detection techniques 202 may detect or recognize a language problem associated with input entered by a user into an application (e.g., application 120 of FIG. 1, which may be a word processor or other text-using application). The detection techniques 202 may be configured to extract words from a stream of intercepted keystrokes as a step in the detection of an error by the user. The extraction of words may be performed by segmenting a character- or keystroke-stream into individual words. In one example, the IME platform process 124 determines word boundaries (e.g., by noting space characters or other delimiters) and extracts words as the user types. Such segmentation (or "word breaking") functionality and detection of potential errors may be performed by separating text using space characters, by using other punctuation and/or by using an appropriate rule-based method.

The detection techniques 202 may be configured to detect or recognize when suggestions should be sought for possible errors in spelling, word use, grammar or other language issues. In the example shown, the suggestions may be sought from the suggestion techniques 204A, 204B, as will be discussed infra. In one implementation, the IME may be part of an operating system, such as Windows® or another operating system. According to the example, characters (e.g., keystrokes resulting from user operating a keyboard) may be intercepted by the IME dynamic link library (e.g., IME DLL 122 of FIG. 1). The IME DLL 122 may be loaded into a host application (e.g., application 120) operated by the user and configured to receive keyboard input from the user. In example operation, the IME DLL 122 may forward keystroke characters to the IME platform process 124, which may be configured as a process running on the client device 102. As the user types, the IME platform process 124 may continue to monitor characters (keystrokes).

The detection techniques 202 may maintain previously typed word(s) in memory, such as within the IME platform process 124 or other location. Such previously typed words may be used (e.g., by the IME platform process 124) to determine the appropriateness of a current word in terms of spelling, context of use, grammar and other linguistic considerations.

The detection techniques 202 may utilize a test or check to determine whether suggestions are needed to replace a word typed by the user. Such testing may be based on a probability of correctness of a word typed by the user and intercepted and recognized by the IME platform process 124. The probability may be based on multiple factors and testing, which may be performed by one or both of local checks (e.g., performed on the client device 102) and remote checks (e.g., performed by the cloud linguist services 106).

In an example of local checks, the intercepted word may be checked against a lexicon (e.g., a dictionary), as well as its likelihood of appearing near previously written (possibly adjacent) words. Thus, a sequence of words may be examined and a determination made if each word is correct and/or if a suggestion for replacement is needed. The determination may be based at least in part on a statistical language model (e.g., unigram models, N-gram models, etc.).

The detection techniques 202 may include one or more statistical language models, which may operate on the IME platform process 124, on the cloud linguistic service(s) 106 or both. Consideration of network connectivity and speed may be used to determine if a local or cloud statistical model should be utilized. Generally, if sufficient network speed and bandwidth is available, statistical language model(s) on the cloud linguistic services 106 should be utilized. The cloud based models may have larger lexicon, better ability to process word sequences and better ability overall to detect errors in spelling, word use and/or grammar. Statistical language models operable in either location may detect errors utilizing factors such as input from a lexicon (dictionary, word list, technical vocabulary, etc.), typing speed and/or back-spacing or other corrections made by the user.

Thus, detection techniques 202 may be performed using IME-based techniques. Using such techniques, the IME DLL 122 may be loaded into each application in a configuration that will be able to intercept all keystrokes within the application and will be able to take into account specific input scopes (words, word sequences and/or word usages, etc.). The IME-based techniques also allow keystrokes to be processed in various ways, including forwarding all processing to a running application, a local service or an external service.

The detection techniques 202 may be utilized in conjunction with non-IME based mechanisms, as well as the IME-based mechanisms previously described. For example, applications programming interfaces (APIs) provided by an operating system of the client device may be used directly to monitor keystrokes either by polling or subscribing to global events.

Suggestion techniques 204A and 204B may be utilized to provide suggestions or alternatives to words indicated by the detection techniques 202 as having a high likelihood of error. The suggestion techniques may include remotely-based or cloud-implemented suggestion techniques 204A and locally-based suggestion techniques 204B. Depending on implementation, suggestion techniques 204A and 204B may be operated in an alternative, parallel and/or complementary manner(s). In one example, the remote suggestion techniques 204A, which may be based within the cloud linguistic services 106, may be the primary source of suggestions. The local suggestion techniques 204B may be utilized only when network connectivity does not allow use of the cloud-based suggestion techniques 204A. In some embodiments, the suggestion techniques 204A available in the cloud linguistic services 106 may provide greater capacity and performance than is available from the suggestion techniques 204B operating on the IME platform process 124. In particular, suggestion techniques that are based on a particular technology may be more effective when provided by the cloud-based suggestion techniques 204A, due to computational advantages of the cloud over the IME platform process 124. Example technologies may include language models based at least in part on unigram model technology, N-gram model technologies, etc. Cloud-based word suggestion-generation resources may be configured to leverage computing power of the cloud, including faster execution, massive lexicons and computationally complex algorithms for which implementation may be impossible on the IME platform process 124. In additional examples, cloud linguistic services 106 may arbitrate between multiple cloud-based services or resources to collect candidate suggestions to replace word errors. The arbitration may be performed by comparison of suggestion provider-based design patterns, provider-used technologies, and how those patterns compare to the suggestion process.

In one example, the cloud linguistic services 106 may return an ordered list of candidates to be suggested to the user to replace the word typed by the user. The suggestions on the list, obtained from cloud-based sources, may be derived from globally based statistical language model(s) and ranked by their respective confidence scores. The IME platform process 124 may also collect an ordered list from locally-determined suggestion candidates. The locally-based suggestion techniques 204B may be based at least in part on user-specific personalization within the application 120 (seen in FIG. 1), previous word use, a local lexicon (which may be associated with the application 120) and use of an edit distance algorithm.

In other examples, candidate suggestions to replace word errors may be either entirely locally-based or entirely cloud-based. In one example of cloud-based suggestion generation, the suggestions can be queried from multiple cloud-based services and aggregated on the client. In the example, a number of data sources (e.g., cloud-based statistical language models, lexicons, etc.) may be varied according to a required speed of the system. In a contrasting example, a single cloud linguistics service may be used as a point of entry to the IME platform 124. Generally, by reducing the number of data sources, candidate suggestions for an erroneous word may be obtained more quickly.

Example User Interface

FIG. 3 shows an example user interface 300, including example operation with a word processing application 302. In the example shown, the system includes a visual display 114, which may be part of a client device (e.g., client device 102 of FIG. 1). In the example of FIG. 3, an application (e.g., the word processor 302) provides a user interface window within the visual display 114. The user is able to enter text into the word processor 302 using a keyboard or other input peripheral.

Various display techniques shown by the example user interface 300 may be performed by the suggestion renderer 126 (as seen in FIG. 1). The display techniques may include receiving and displaying one or more candidate suggestions obtained by operation of the suggestions techniques operating on the IME platform process 124 and/or cloud linguistic services 106. The display techniques may include logic and rules governing how and when suggestions may be displayed to the user.

The user may misspell a word, violate a rule of grammar or otherwise enter text that indicates that the user would benefit from assistance. In the example of FIG. 3, the user has type "fizix," a misspelling of the word "physics." In response, a notification window 304 opens, such as by operation of the suggestion renderer 126 of FIG. 1. The notification window 304 may resemble a "speech bubble" or "balloon" and may include a tail 306, which may be used to indicate association with an IME bar 308. The example notification window 304 is configured to allow the user to avoid unwanted distraction, and may provide a closure box 310, to allow the user to remove the notification window 304 portion of the user interface when it becomes a distraction.

In one example, only the single most preferred suggestion for replacement of the detected erroneous word is displayed. The preferred suggestion is provided if a confidence score is greater than a threshold value (e.g., 90%) that the suggestion is correct. Also, the preferred suggestion is provided if it can be obtained within a threshold period of time after the user typed the word thought to be erroneous.

The notification window 304 may provide a suggestion 312 for a misspelled word, misused word, or grammatical error, etc. Three examples are representative of ways that the suggestion may be utilized by the user. In a first example, the user may click command 314, to thereby replace the erroneously typed text with the suggestion 312. In a second example, the user may click command 316 to copy the suggested change to the clipboard. Once on the clipboard, the suggested text may be used in any application, and may be used with applications that fail to perform correctly if the command 314 selected. In a third example, the user may simply copy the text seen at suggestion 312 by typing it into any application. Additionally, the user may turn off the English assistance by operation of command 318.

Figure 4:
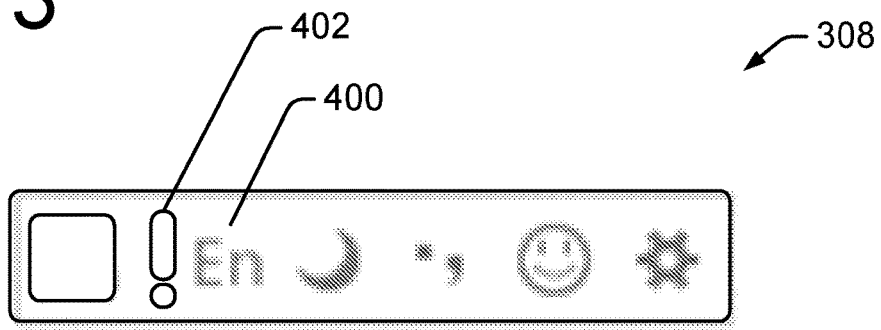
FIG. 4 shows a further example of the user interface, including an IME bar.

FIG. 4 shows a further example of the user interface provided by an IME (e.g., the IME platform process 124 of FIG. 1). The user interface may include an IME bar 308 adapted for use with a plurality of different applications running on a client device. In the example shown, the IME bar 308 is enhanced by addition of an English indicator 400 and an event indicator 402. The English indicator 400 provides a reminder to the user that the IME is in an "English" mode. Within English mode, a user may type in English and create a document in English. Accordingly, typed characters are simply "passed through" the IME (and into the application) without action by the IME, unless a potential error is detected. Alternative modes of operation by the IME may be indicated by indicators (not shown) that are alternative to the English indicator 402. In one example of an alternative mode of IME operation, input is provided by a user typing "Roman" letters, and output is provided in symbols of a different language (e.g., Chinese characters).

An event indicator 402 may be configured to appear and/or change in appearance (e.g., color) to indicate an event. In one example, the event indicator may be an exclamation mark or other symbol, typically indicating concern and/or urgency. The event or issue indicated by the event indicator 402 may include detection of an error or potential error in spelling, word use, grammar or other aspect checked by the IME. To continue the example, upon appearance (or change in appearance) of the event indicator 402, the user may "mouse over" or otherwise select the event indicator to receive a suggestion from the IME. The suggestion may be provided by appearance of the notification window 304 or other user interface element. Thus, selection of the event indicator 402 may result in appearance of, or change in the content of, the notification window 304.

Example Methods

Figure 5:
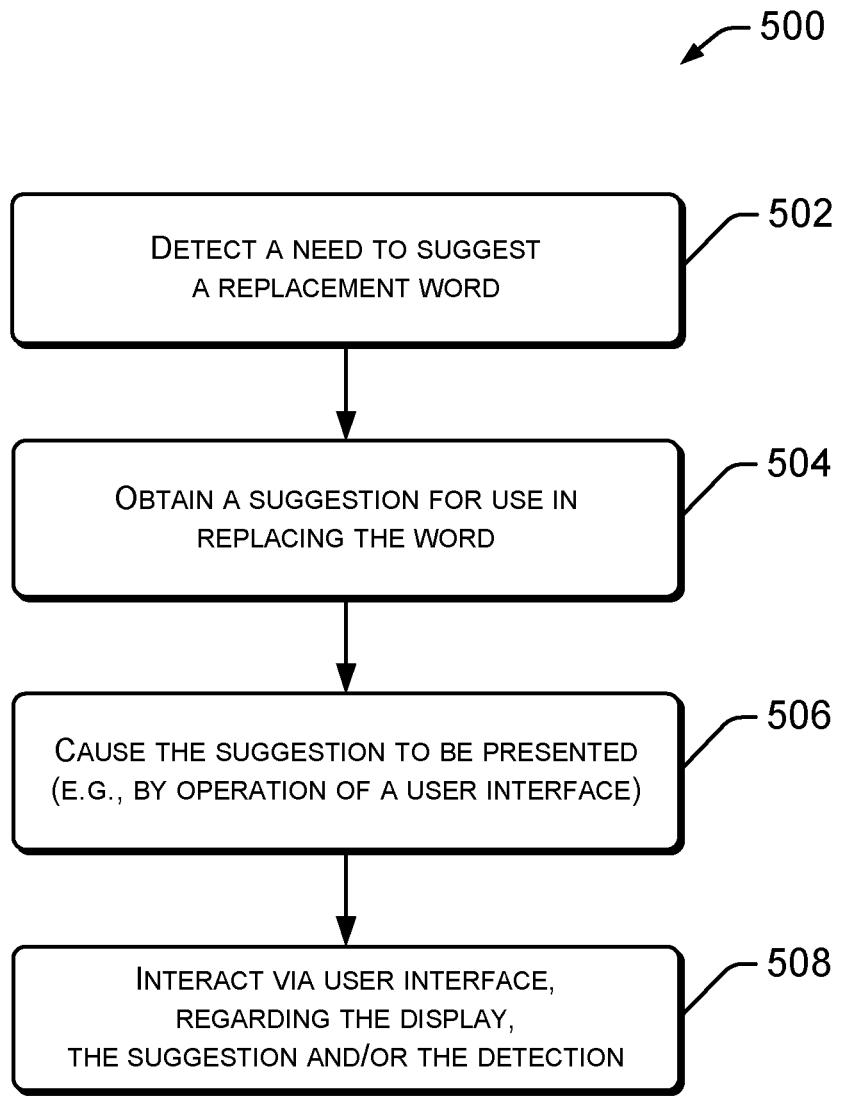
FIG. 5 is a flow diagram showing an example method of operation of an IME, including techniques for detection, suggestion, display and interaction.

FIG. 5 is a flow diagram showing an example method 500 of operation of an IME. In one example, the IME operates out-of-process with respect to an application that involves user-entry of text. As the user enters text, keystrokes are passed by an in-process IME DLL to the application and to the IME platform process. A detection process may employ one or more techniques to determine if a suggested replacement should be sought for a word typed by the user. If so, a suggestion process may employ one or more techniques to select and/or obtain a suggested word to replace the word typed by the user. A display process may employ one or more techniques to display the suggested word to the user (e.g. in a user interface having an unobtrusive appearance). An interactive process may employ one or more techniques to receive user input, such as to utilize the suggested word or to adjust the appearance of the user interface.

At operation 502, a need to suggest a word to replace a word typed by a user is detected. In some instances, the detection is in response to recognition that the word typed by the user is misspelled. Alternatively, the detection may result from recognition that the word is used in a grammatically incorrect manner or has otherwise been misused. In the examples of FIGS. 1 and/or 2, the detection techniques 202 operating on the IME platform process 124 may perform the detection functionality.

At operation 504, a suggestion is obtained for the word, e.g., in response to detection of the need for a suggestion. The suggestion may be obtained over a network and from cloud-based resources (e.g., cloud linguistic services 106 of FIGS. 1 and 2). Alternatively, the suggestion may be obtained locally, such as by operation of suggestion techniques 204B operating on a client device 102 and/or an IME platform process 124. In one example, the suggestion may be a correctly spelled word for which there is a high confidence level corresponds to the intended meaning of the user.

At operation 506, the suggestion is displayed to the user, such as by operation of a user interface. In one example, the IME platform process 124 may provide data, and together with the suggestion renderer 126, may cause the suggestion to be presented. The user interface may be unobtrusive and/or may be regulated by the user to control a degree to which it intrudes on the user's operation of an application on the client device. FIGS. 3 and 4 show example user interfaces that may be utilized to display a suggestion for consideration by a user.

At operation 508, the user may interact with the user interface. In several examples, the user may provide input regarding: the detection process whereby a suggestion was found to be necessary; the suggestion process by which a replacement word was obtained; the display process by which the replacement word was presented to the user; or feedback as provided and/or supported by the IME. In the example of FIGS. 3 and 4, the user may interact with the user interface by click or rollover of the event indicator 402, the selection of a command or option provided by the notification window 304, etc.

Figure 6:
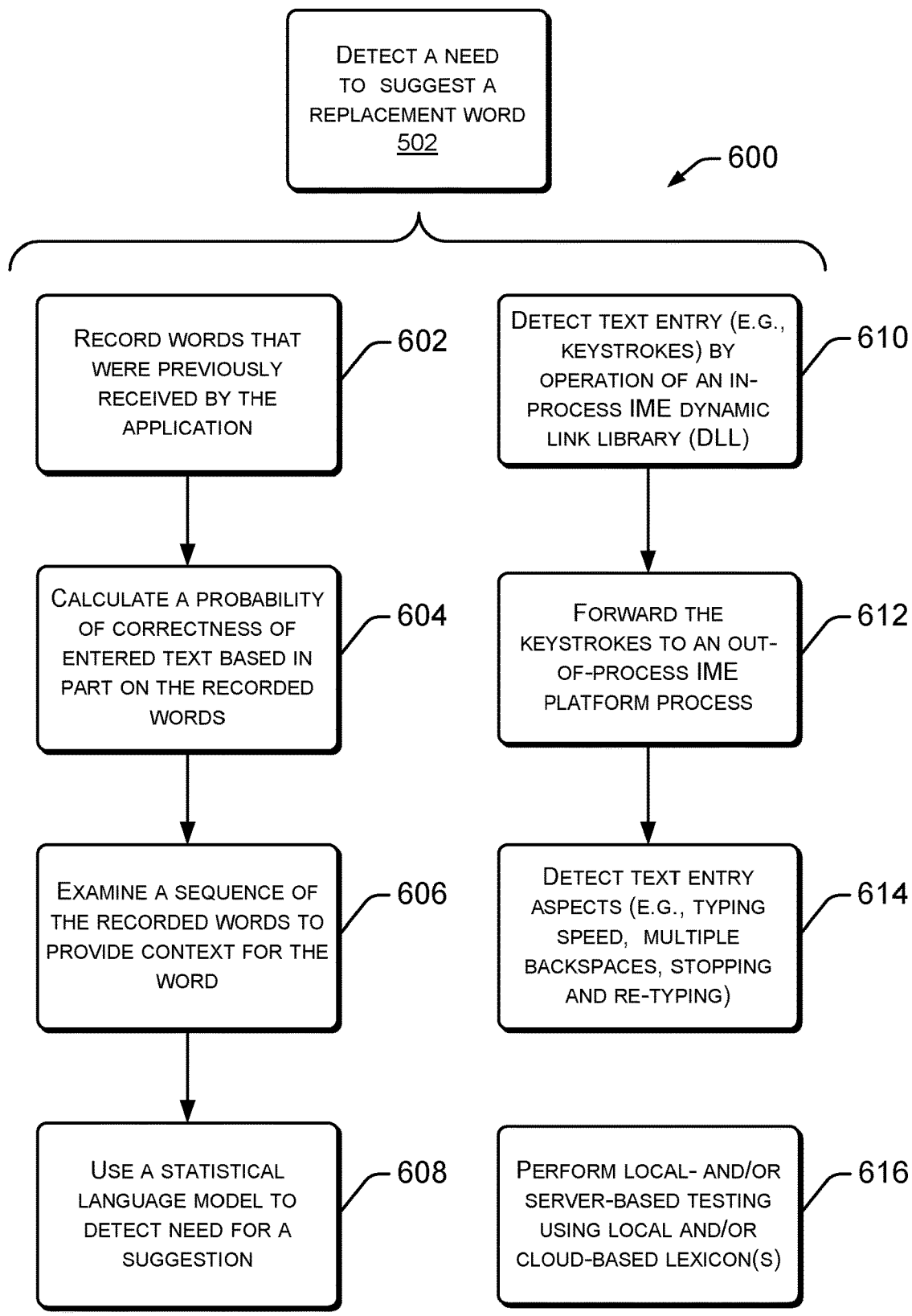
FIG. 6 is a flow diagram showing several example detection techniques.

FIG. 6 is a flow diagram showing several example detection techniques 600 that may be used to configure an IME platform process to detect a need for a suggestion to replace a word typed by a user. Accordingly, one or more of the detection techniques 600 may optionally be utilized to perform all or part of the detection operation 502 of FIG. 5. At operation 602, words the application receives, such as from a user typing, may be recorded. Alternatively, the received words may be obtained from speech recognition techniques or another text entry method. Accordingly, when a word is detected that may be incorrectly spelled and/or used, that detection may be made in the context of previously typed words. In the example of FIG. 2, the detection techniques 202 may record words within the IME platform process 124. The recorded words are available for purposes of grammar, word context and usage, etc. At operation 604, a probability of correctness of the word typed by the user may be calculated. The calculated probability may be based in part on the words previously recorded. The probability of correctness may be based on local checks on a client or server side checks performed in the cloud and received at the client. The checks may include checks for the word in the local lexicon or a cloud-based lexicon. The probability may be based on operation of remote or local resources (e.g., a cloud linguistic service). The resources may include operation of statistical language model(s). At operation 606, a sequence of recorded words typed by the user may be examined to provide context for a current word typed by the user. The examination may be performed locally by the IME platform process 124 or in the cloud by one or more cloud linguistic services 106. At operation 608, a statistical language model may be used to detect a need for a suggestion. Such models may reside on the IME platform process 124, although larger and more comprehensive models may reside within cloud linguistic services 106.

In a further example, at operation 610 keystrokes are detected within an application by operation of an in-process IME dynamic link library (DLL). In the example of FIG. 1, the IME DLL 122 detects keystrokes which are passed to the application 120. At operation 612, the keystrokes are forwarded to an out-of-process IME platform process. In the example of FIG. 1, the keystrokes detected by the IME DLL 122 are also passed to the IME platform process 124. At operation 614, typing speed, typing speed changes, multiple typing of backspace characters, re-typing and/or the stopping of typing may be detected by the IME platform process. Such typing characteristics may be considered by the detection techniques 202 on the IME platform process 124, when attempting to detect a need to suggest a word to replace a word typed by a user.

At operation 616, local- and/or server-based testing may be performed on one or more received words. The testing may be performed using local and/or cloud-based lexicon(s), statistical language model(s) and/or cloud-based linguistic service(s). Local testing may be performed by the IME platform process 124 and cloud-based testing may be performed by cloud linguistic services 106. The testing may be coordinated, and/or the results of the testing received, at the IME platform process.

Figure 7:
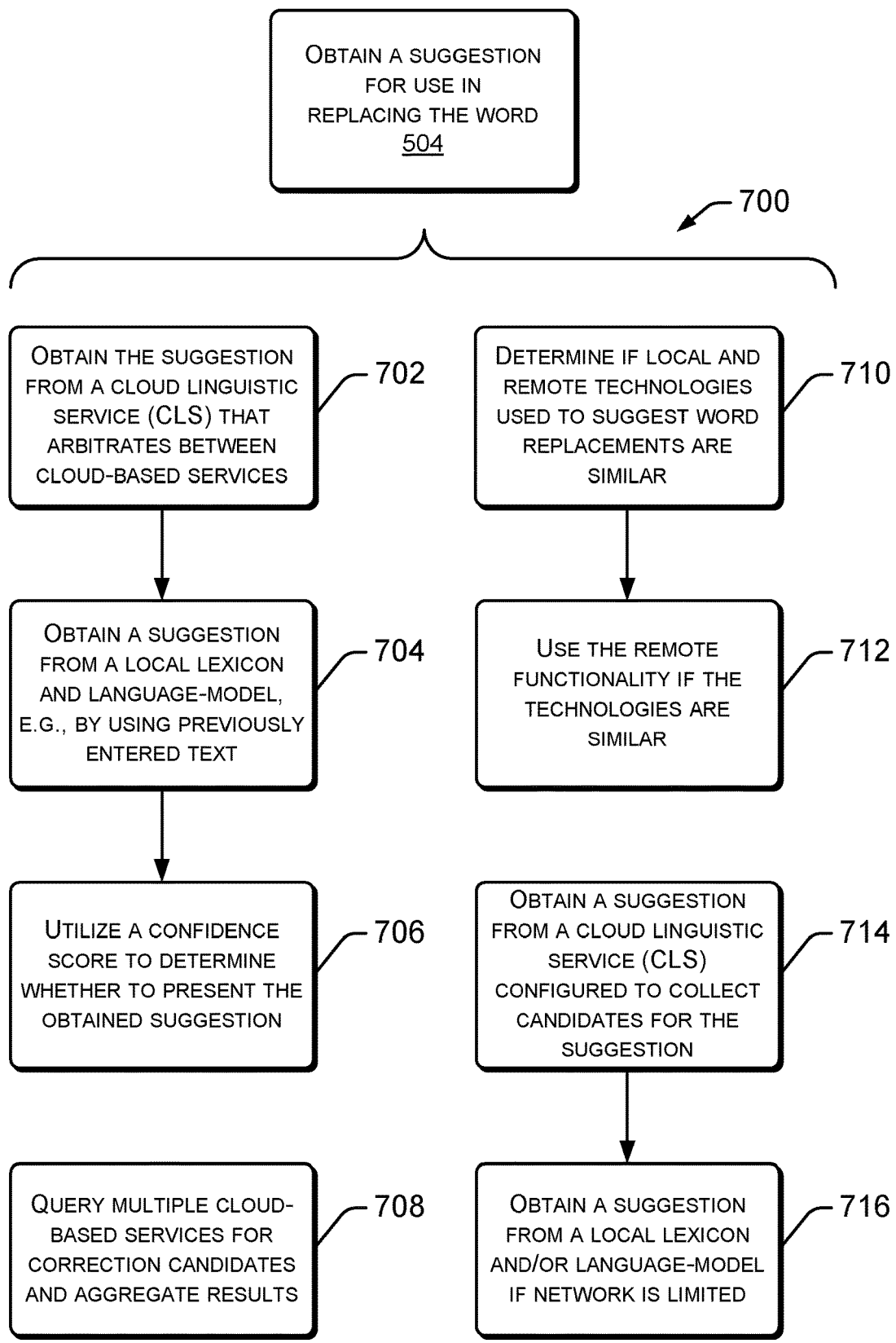
FIG. 7 is a flow diagram showing several example suggestion techniques.

FIG. 7 is a flow diagram showing several example suggestion techniques 700 that may be used to configure an IME platform process to obtain a suggestion for use in replacing a word typed by a user. Accordingly, one or more of the suggestion techniques 700 may optionally be utilized to perform all or part of operation 504 of FIG. 5, wherein a suggestion is obtained, either from IME-based resources or cloud-based resources. In the example of operation 702, a suggestion is obtained from a cloud linguistic service (CLS) that arbitrates between one or more cloud-based services. Accordingly, more than one service may be used, and a selection made from among the results. In the example of operation 704, a suggestion is obtained from a local lexicon and/or a local or remote statistical language model. The suggestion may be based at least in part on previously typed words. In the example of operation 706, a confidence score may be utilized to determine whether to present the obtained suggestion.

In the example of operation 708, multiple cloud-based services may be queried for correction candidates and the results aggregated. The results may be aggregated by the IME platform process 124 (FIGS. 1 and 2). In one example, cloud-based services may be queried for correction candidates and probabilities. The probabilities may each be formed as a confidence score that an associated correction candidate is correct.

In the example of operation 710, the IME may determine if technologies employed by local and remote (e.g., server- or cloud-based) resources to suggest word replacements are similar. At operation 712, if the technologies are similar, then the remote resources are utilized. In one example, the IME platform and a cloud-based linguistic service may use a similar statistical language model, and the remote statistical model may be used. The computing power of the cloud may make this choice preferable.

In the example of operation 714, a suggestion may be obtained from a cloud linguistic service (CLS) that is configured to collect candidates for the suggestion to replace a word typed by the user. Such a suggestion may be obtained if network connectivity is adequate. Alternatively, at operation 716 a suggestion may be obtained from a local lexicon and/or language model if the network connectivity is not adequate.

Figure 8:
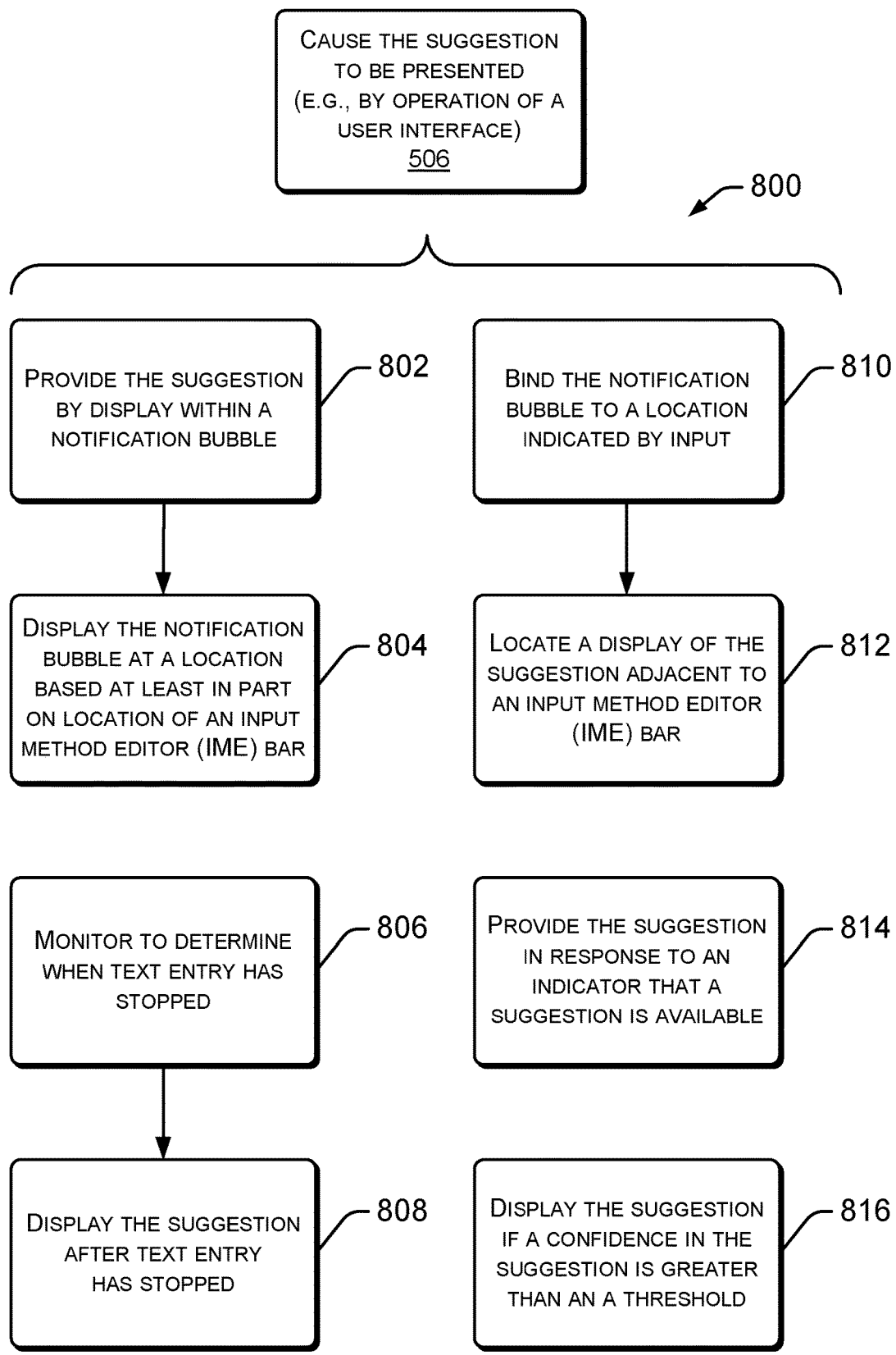
FIG. 8 is a flow diagram showing several example display techniques.

FIG. 8 is a flow diagram showing several example display techniques 800 that may be used within a user interface to display the suggestion, if obtained by the suggestion techniques. Accordingly, one or more of the display techniques 800 may optionally be utilized to perform all or part of operation of 506 of FIG. 5, wherein a suggestion is displayed. In the example of operation 802, a word obtained as a suggestion for replacement of a word typed by the user may be provided to the user by displaying the suggestion using any user interface techniques, such as a notification bubble. The notification bubble 304 of FIG. 3 is one example of such presentation, but other techniques are also within the scope of the operation. In the example of operation 804, the notification bubble may be displayed at a location that is based at least in part on location of an IME bar. FIG. 3 shows that the notification bubble 304 may be attached to the IME bar 308 by a tail 306. Movement of the IME bar 308 or notification bubble 304 may result in movement of both, depending on a selected configuration, setting or design.

In the example of operation 806, the user may be monitored by the IME to determine when the user stops typing. If the user stops typing, that may be a factor indicating or weighing toward uncertainty on the part of the user regarding the accuracy of one or more words the user has typed. Other factors indicating possible user confusion may include slowed typing, back-spacing and/or deleting, re-typing, and others. At operation 808, the user interface (e.g., the notification bubble 304 of FIG. 3) may display the suggestion after the user has stopped typing. By waiting until the user stops or slows the typing process, performs one or more back-spaces and/or re-typing, the user interface is less likely to intrude on the user's thoughts with unnecessary suggestions.

In the example of operation 810, unwanted intrusion on the user may be prevented by binding, fixing or moving the notification bubble 304 to a location selected by the user. At operation 812, the display of the word suggestion (e.g., the notification bubble) may be located adjacent to the IME bar. Thus, the user may move the notification bubble and/or the IME bar to a location on a display (e.g., a video display screen, display of a mobile device, etc.) that is less intrusive and/or preferred for any reason. In some examples, the notification bubble 304 and IME bar 308 move together (e.g., joined by the tail 306), and in other examples they are separately movable.

In the example of operation 814, the suggestion may be provided to the user in response to an indicator that a word suggestion is available. In the example of FIG. 4, the event indicator 402 may appear and/or appear in bold, in color or in an otherwise recognizable "active" mode. The user may click or mouse-over the event indicator 402, thereby triggering appearance of a user interface device, such as the notification bubble 304.

In the example of operation 816, the suggestion for use in word replacement may be displayed if a confidence in the suggestion is greater than a threshold value. In the example, the threshold may be set at a level that does not interfere with the user unless the confidence level of a user error is sufficiently high.

Figure 9:
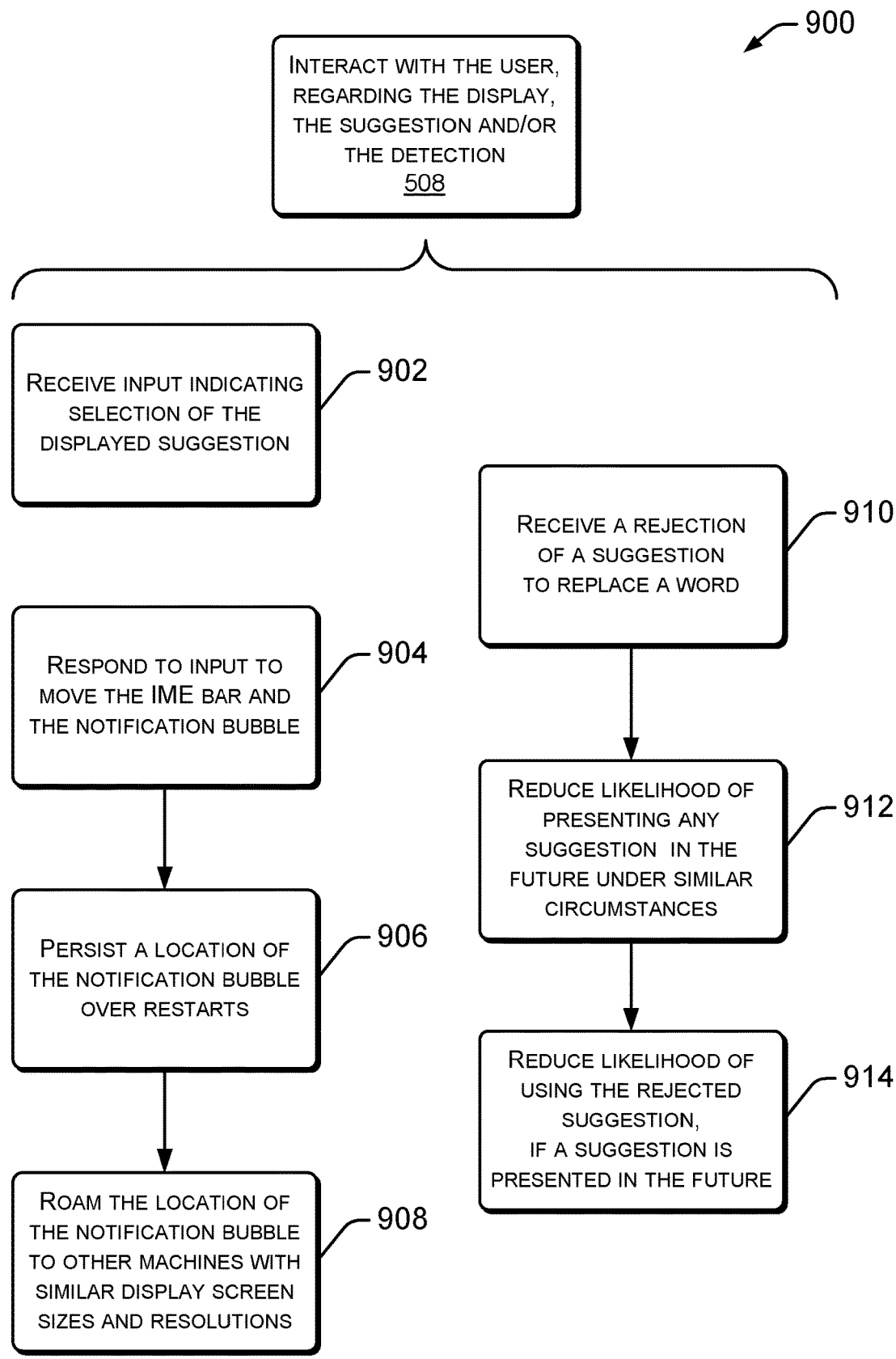
FIG. 9 is a flow diagram showing several example interaction techniques.

FIG. 9 is a flow diagram showing several example interaction techniques 900 that may be used to interact with a user, if a suggestion was displayed. Accordingly, one or more of the interaction techniques 900 may optionally be utilized to perform all or part of operation 508 of FIG. 5, wherein the IME interacts with a user. In the example of operation 902, input may be received from the user to utilize the displayed suggestion. Thus, user indicates that the suggested word should in fact be substituted for the problematic word typed by the user. In the example of FIG. 3, the user may select command 314 to replace the questionable word typed by the user with the word suggested by the IME.

In the example of operation 904, the IME may respond to user input to move the IME bar and/or the notification bubble. In the example of FIG. 3, the notification bubble 304 and the ME bar 308 are shown in a lower portion of the visual display 114. However, these could be moved to a different location, if desired by the user, such as by manual manipulation by touch screen, mouse or pointing device. In the example of operation 906, a location of user interface element(s) may be persisted over restarts or reboots of the user's computing device. In the example of FIG. 1, the IME platform process 124 may maintain a location of user interface elements shown by FIGS. 3 and/or 4 over reboots or restarts of the client device 102. In the example of operation 908, the location of user interface elements may be "roamed" or utilized by other machines used by the user. In a particular example, if the user has two different client devices with similar display screen sizes and/or resolutions, then any changes to the user interface of one device may be transferred to, and utilized by, the other device as well. If the display screens are somewhat different, then changes to one device may be mapped to the other device in a manner that approximates a presentation on a user interface of the other device.

In the example of operation 910, the IME may receive a rejection from the user of the suggestion made by the IME to replace a word(s) typed by the user. At operation 912, in response to the rejection, the IME may reduce a likelihood of presenting any suggestion in the future under similar circumstances. At operation 914, the IME may reduce a likelihood of presenting the rejected suggestion if a suggestion is to be presented in the future under similar circumstances.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. In contrast, communication media may embody computer-readable instructions, data structures, program modules, or other data in a modulated data signal, such as a carrier wave. As defined herein, computer storage media does not include communication media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage storing computer executable instructions that, when executed, cause one or more processors to perform acts comprising:
   detecting keystrokes within an application by operation of an in-process input method editor (IME) dynamic link library (DLL);
   forwarding the keystrokes detected within the application by operation of the in-process IME DLL to an out-of-process IME platform process, wherein the out-of-process IME platform process is located within a defined computer-readable memory address range separate and distinct from an address range within which the application is defined;
   detecting a need for a suggestion to assist with input of a word into the application, the detecting comprising:
      accessing words entered into the application and recorded; and
      calculating a probability of correctness of the word input based at least in part on the recorded words;
   obtaining a suggestion for replacement of the word, if indicated by the calculated probability, the obtaining comprising:
      obtaining the suggestion from a cloud linguistic service (CLS);
      if network capability used to communicate with the CLS is limited or non-existent, then obtaining a suggestion from a local lexicon or statistical language-model, based at least in part on the recorded words previously entered into the application; and
      utilizing a confidence score for an obtained suggestion to determine whether to present the obtained suggestion;
   providing the obtained suggestion for display if indicated by the confidence score, the providing comprising:
      providing the obtained suggestion for display within a notification bubble; and
      providing the notification bubble for display at a location based at least in part on location of an IME bar; and
   moving the IME bar and/or the notification bubble in response to input signifying movement.

2. The one or more computer-readable storage as recited in claim 1, wherein detecting the need for the suggestion additionally comprises:
   detecting typing speed, detecting typing stopping, detecting multiple backspaces, or detecting re-typing by the user.

3. The one or more computer-readable storage as recited in claim 1, wherein calculating the probability of correctness of the word is based on at least one of multiple factors, including:

locally checking on a client or server side checking, the checking comprising checking for the word in the local lexicon or a cloud-based lexicon, respectively; or examining a sequence of the recorded words to provide context for the word.

4. The one or more computer-readable storage as recited in claim 1, wherein obtaining the suggestion comprises:

querying one or more cloud-based services for correction candidates and associated probabilities, each associated probability representing a confidence score that an associated correction candidate includes a correct suggestion;

wherein the CLS is configured to arbitrate between multiple cloud-based services to collect candidates for suggestions.

5. The one or more computer-readable storage as recited in claim 1, wherein:

detecting the need for the suggestion includes monitoring to determine when text entry stops; and providing the suggestion for display includes providing the suggestion for display after text entry stops.

6. The one or more computer-readable storage as recited in claim 1, additionally comprising:

persisting the location of the notification bubble over restarts; and roaming the location of the notification bubble.

7. An input method editor (IME), comprising:

an out-of-process IME platform process configured to:

receive, from an in-process IME dynamic link library (DLL), keystrokes detected by an application of the in-process DLL, wherein the out-of-process IME platform process is located within a defined computer-readable memory address range separate and distinct from an address range within which the application is defined;

detect a need for a suggestion to fix a word entered into an application operating on a computing device;

obtain the suggestion from a cloud linguistic service (CLS) through a network connection on the computing device; and obtain the suggestion from a local lexicon or language-model if network capability used to communicate with the CLS is limited or nonexistent; and a suggestion renderer operating on the computing device and configured to prepare the suggestion for display, preparation of the suggestion for display comprising:

causing display of the suggestion within a notification bubble; and binding the notification bubble according to received input.

8. The input method editor as recited in claim 7, wherein the IME platform process is additionally configured to:

receive instructions for use of the displayed suggestion; and respond to input to move the notification bubble.

9. The input method editor as recited in claim 7, additionally comprising:

the DLL configured in-process and configured to relay keystrokes to the IME platform.

10. The input method editor as recited in claim 7, wherein the IME platform process and the suggestion renderer are configured out-of-process.

11. A method, comprising:

detecting keystrokes within an application by operation of an in-process input method editor (IME) dynamic link library (DLL);

forwarding the keystrokes detected within the application by operation of the in-process IME DLL to an out-of-process IME platform process, wherein the out-of-process IME platform process is located within a defined computer-readable memory address range separate and distinct from an address range within which the application is defined;

detecting, by operation of one or more processors configured with executable instructions, a need for a suggestion to an error in text entered into the application, the detecting comprising testing for whether suggestions are needed based on a probability of correctness of a word, wherein the probability is based on multiple factors, including local checks on a client or check by a server received at the client;

obtaining, by operation of the one or more processors configured with the executable instructions, a suggestion for a replacement for the word, the obtaining comprising querying services for correction candidates and probabilities, in the form of a confidence score, that the correction is likely;

causing the suggestion to be displayed if a confidence in the suggestion is greater than an threshold, the displaying comprising:

providing the suggestion in response to selection of an indicator that a suggestion is available; and locating a display of the suggestion adjacent to an IME bar; and operating a user interface, the operating comprising:

receiving instructions for use of the displayed suggestion; and responding to input to move the displayed suggestion to a preferred screen location.

12. The method as recited in claim 11, wherein detecting the need for the suggestion additionally comprises:

detecting that text entry has slowed.

13. The method as recited in claim 11, wherein detecting the need for the suggestion additionally comprises:

examining a sequence of words to provide context for the word; and using a statistical language model having input including the sequence of words.

14. The method as recited in claim 11, wherein obtaining the suggestion for the replacement additionally comprises:

obtaining the suggestion from a cloud linguistic service (CLS) if permitted by network capability; and obtaining the suggestion from a local lexicon or language-model if network capability does not provide connection with the CLS.

15. The method as recited in claim 11, wherein obtaining the suggestion for the replacement additionally comprises:

querying multiple cloud-based services; and aggregating results from the multiple services.

16. The method as recited in claim 11, wherein causing the suggestion to be displayed comprises:

monitoring to determine when text entry has stopped; and displaying the suggestion after the text entry has stopped.

17. The method as recited in claim 11, wherein operating the user interface comprises:

receiving a rejection of the suggestion to replace the word;

reducing likelihood of the suggestion to replace the word in the future; and reducing likelihood that the word will be considered problematic in the future.

18. The method as recited in claim 11, wherein obtaining the suggestion comprises:

determining if a technology of local functionality to suggest the replacement is similar to a technology of remote functionality used to suggest the replacement; and using the remote functionality if the technologies are similar.

* * * * *